R. C. BERRY.
BAND SAW LUBRICATOR.
APPLICATION FILED MAR. 8, 1919.
1,379,385.    Patented May 24, 1921.
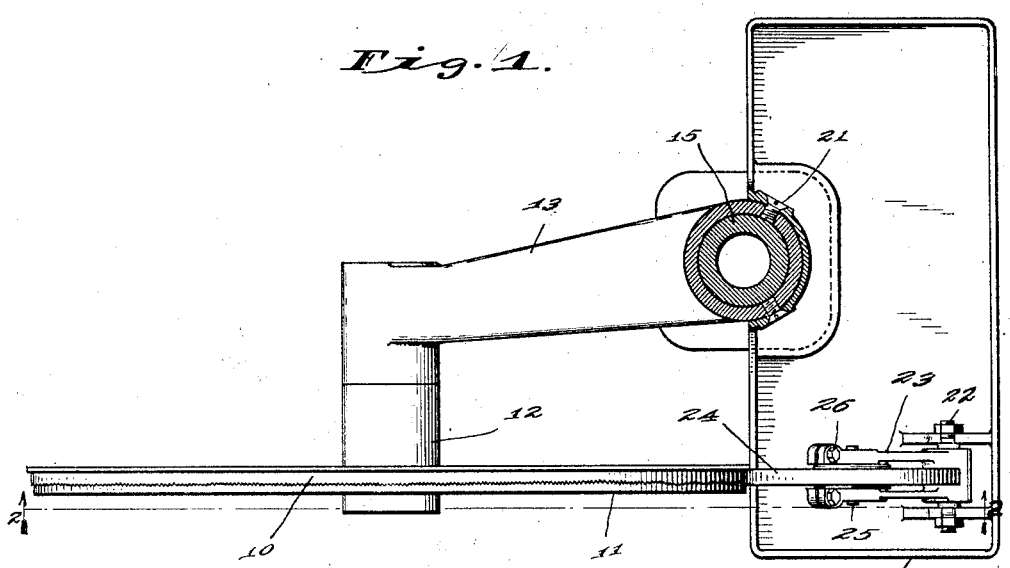
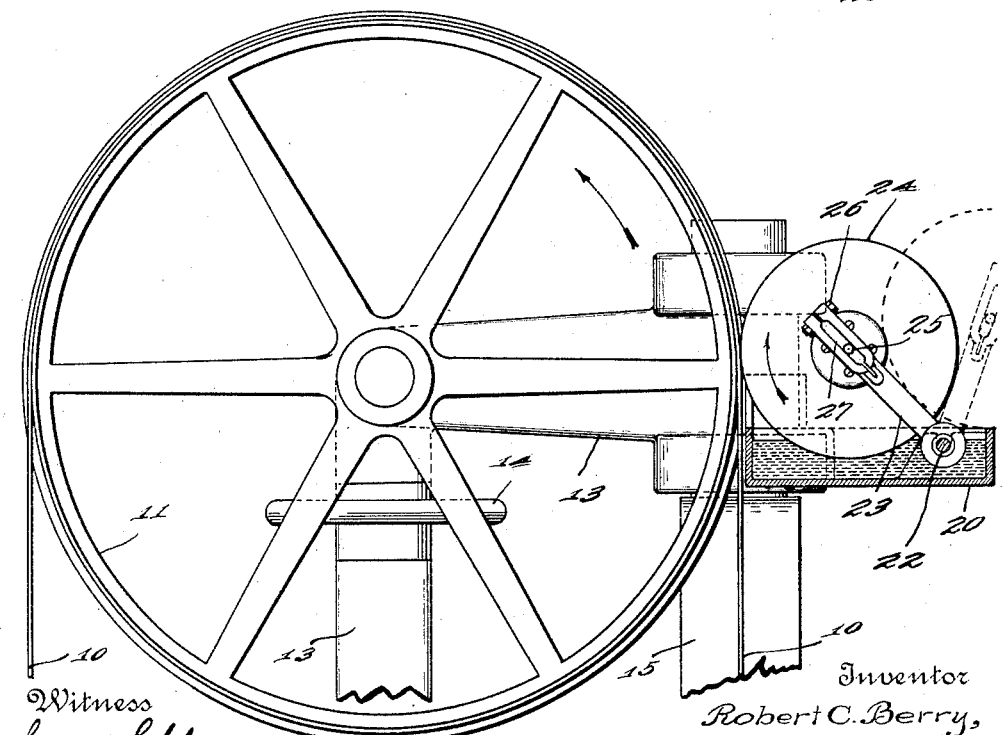
Inventor
Robert C. Berry,

UNITED STATES PATENT OFFICE.

ROBERT C. BERRY, OF INDIANAPOLIS, INDIANA, ASSIGNOR TO E. C. ATKINS & COMPANY, OF INDIANAPOLIS, INDIANA, A CORPORATION OF INDIANA.

BAND-SAW LUBRICATOR.

1,379,385.      Specification of Letters Patent.      Patented May 24, 1921.

Application filed March 8, 1919. Serial No. 281,416.

*To all whom it may concern:*

Be it known that I, ROBERT C. BERRY, a citizen of the United States, residing at Indianapolis, in the county of Marion and State of Indiana, have invented a new and useful Band-Saw Lubricator, of which the following is a specification.

It is the object of my present invention to provide a simple and effective lubricator for band saws, for supplying the lubrication and cooling liquid in proper quantity without waste and with minimum scattering.

The accompanying drawing illustrates my invention: Figure 1 is a plan of part of a band-saw machine, with my lubricator applied thereto; and Fig. 2 is an elevation thereof.

The band saw 10 is carried by the usual band wheels 11, of which only one is shown; and these band wheels are mounted in suitable bearings 12 carried by a suitable supporting frame 13, which may be provided with any convenient adjusting device 14 for varying the tension of the band saw by varying the distance between the band wheels 11. The frame 13 is shown as a swinging frame, mounted to swing on a fixed supporting frame 15, as set forth in my prior Patent No. 1,287,193, granted December 10, 1918, the frame 13 having suitable bearings on said fixed frame 15, as is clear from the drawings; but the broad features of my invention are not limited to a band-saw machine of the swinging type.

A lubricant-holding pan 20 is mounted in fixed relation to the frame which directly carries the band wheels 11, in the case shown being mounted on the swinging frame 13 so that said lubricant-holding pan will swing with such frame 13. As shown, this pan 20 is fastened by screws 21 to the pivotal end of the upper arm of the swinging frame 13, and conforms in shape to such pivotal end where it fits thereupon. This pan 20 is located close to the band saw 10 at the point where such band saw passes onto the upper band wheel 11, which is the band wheel shown. Swingingly mounted within the pan 20, as on a bearing pin 22, is a bifurcated arm 23, between the two prongs of which is a lubricant-applying wheel 24 mounted on a bearing pin 25 supported on such two prongs. The pin 25 is preferably adjustable along the arm 23, conveniently by having the ends of each prong of such arm split to form a slotted clamp which may be clamped by clamping bolts 26 to hold the pin 25 in any desired position in a slot 27 which forms part of such split. When the arm 23 and wheel 24 are in working position, shown in full lines in Fig. 2, the wheel dips into the lubricant in the pan 20 and also projects beyond the edge of such pan to bear aganst the band saw 10 at about the point where it passes onto the upper band wheel 11. The parts are yieldingly held in this position, as by the action of gravity on account of the oblique position shown; and as the band saw operates, the wheel 24 is turned by its friction with the moving band saw 10, and carries lubricant from the pan 20 onto the surface of such band saw. The lubricant may be of any desired kind, such as a solution of soluble cutting oil; and the lubricant-applying wheel may be of any material which will produce the described action, the most convenient material which I have found being wood. When desired, the arm 23 and wheel 24 may be thrown back to the dotted-line position shown in Fig. 2, in which position the wheel 24 is out of engagement with the band saw 10. The parts will also remain in this position by gravity, as the arm 23 is swung beyond the vertical.

In operation, with the parts in the full-line position, the wheel 24 lubricates the band saw 10 as the latter moves; and this lubrication takes place in the same way regardless of the swinging movements of the swinging frame 13, as the pan 20 swings with such frame, and the lubricant-applying wheel 24 always engages the band saw 10 at substantially the point where the band saw passes onto the upper band wheel 11.

I claim as my invention:

In a band-saw machine, the combination with the band wheels and their supporting frame, of a lubricant-applying wheel for engaging at one of the band wheels the band saw carried by said band wheels, a swinging arm in which said lubricant-applying wheel is mounted, and a lubricant-containing pan into which said lubricant-applying wheel dips when it bears against the band saw.

In witness whereof, I have hereunto set my hand at Indianapolis, Indiana, this fourth day of March, A. D. one thousand nine hundred and nineteen.

ROBERT C. BERRY.